(12) United States Patent
Bock

(10) Patent No.: US 8,821,221 B1  
(45) Date of Patent: Sep. 2, 2014

(54) CAPTIVE BOLT TOOL SYSTEM FOR USE IN HUMANE DISPATCH OF LIVESTOCK

(71) Applicant: Randall Bock, Phillipsburg, PA (US)

(72) Inventor: Randall Bock, Phillipsburg, PA (US)

( * ) Notice: Subject to any disclaimer, the term of this patent is extended or adjusted under 35 U.S.C. 154(b) by 0 days.

(21) Appl. No.: 13/798,834

(22) Filed: Mar. 13, 2013

(51) Int. Cl.
*A22B 3/00* (2006.01)
*A22B 3/02* (2006.01)

(52) U.S. Cl.
CPC .................................. *A22B 3/02* (2013.01)
USPC ............................................................. 452/65

(58) Field of Classification Search
CPC .............. A22B 3/00; A22B 5/00; A22B 7/00; A22B 3/005; A22B 3/02; A22B 3/086; A22B 3/06; A22B 5/007; A22B 5/0088; A22C 21/0069; A22C 21/0092; A22C 21/0053; A01B 13/14; A01K 29/00; A01K 45/005
USPC .......................... 452/52, 57, 60–65, 166–170
See application file for complete search history.

(56) References Cited

U.S. PATENT DOCUMENTS

| | | | |
|---|---|---|---|
| 3,068,601 A | | 12/1962 | Arrowsmith |
| 3,112,519 A | * | 12/1963 | Hlavacek et al. ............... 452/54 |
| 3,284,845 A | * | 11/1966 | Termet ........................... 42/1.12 |
| 3,686,713 A | * | 8/1972 | Lewis .............................. 452/63 |
| 3,798,707 A | * | 3/1974 | Willems et al. ................. 452/62 |
| 4,219,905 A | * | 9/1980 | Thacker et al. ................. 452/62 |
| 4,280,248 A | | 7/1981 | Herubel |
| 4,497,377 A | | 2/1985 | Haytayan |
| 4,575,900 A | | 3/1986 | Hamel et al. |
| 4,625,442 A | * | 12/1986 | Hill et al. ........................ 42/1.12 |
| 4,757,627 A | * | 7/1988 | Saligari .......................... 42/1.12 |
| 5,692,951 A | * | 12/1997 | Huff ................................. 452/62 |
| 5,727,996 A | * | 3/1998 | Newton .......................... 452/57 |
| 6,135,871 A | * | 10/2000 | Jones .............................. 452/62 |
| 6,250,007 B1 | * | 6/2001 | Payne et al. ..................... 42/1.12 |
| 6,769,976 B2 | * | 8/2004 | Bass ................................ 452/62 |
| 7,575,507 B2 | * | 8/2009 | King et al. ...................... 452/57 |
| 7,625,267 B2 | * | 12/2009 | Andersen ........................ 452/65 |
| 8,152,605 B1 | | 4/2012 | Koechner et al. |
| 2004/0209562 A1 | | 10/2004 | Jones |
| 2013/0023190 A1 | | 1/2013 | Evans |

FOREIGN PATENT DOCUMENTS

WO  2011/127415 A1  10/2011

OTHER PUBLICATIONS

M.A. Erasmus, "Using time to insensibility and estimated time of death to evaluate a nonpenetrating captive bolt, cervical dislocation, and blunt trauma for on-farm killing of turkeys," 2010 Poultry Science Association Inc., Accepted Apr. 7, 2010, pp. 1345-1354.

Pamphlet entitled "The Zephyr-E—A Solution to Humane Euthanasia for Piglets" (believed to have been offered for sale, publicly used, and/or published prior to the filed of this application).

(Continued)

*Primary Examiner* — Richard Price, Jr.

(74) *Attorney, Agent, or Firm* — Gifford, Krass, Sprinkle, Anderson & Citkowski, P.C.; Douglas L. Wathen

(57) ABSTRACT

A captive bolt tool system includes a tool housing with a working end and a moveable bolt having an end effector. Interchangeable subject adapters may be connected to the tool housing to alter the characteristics of the tool system. A two-stage end effector allows non-penetrating dispatch of livestock.

20 Claims, 6 Drawing Sheets

(56) References Cited

OTHER PUBLICATIONS

"Cash Special" & "Short cash Special Stunners," [online], retrieved from: http://www.acclesandshelvoke.co.uk/media/Cash%20Special%20 Safe%20Operating%208%20Cleaning%20Instructions%20A4.pdf, 6 pages (believed to have been offered for sale, publicly used, and/or published prior to the filing date of this application).

"CASH" .22 Pultry Killer Cartridge Powered Tool (CPK2), [online], retrieved from: http://;www.acclesandshelvoke.com.uk/media/Poultry%20Killer%20.22%Safe%20Operating%20 Cleaning%20 &%20Maintenance%20Instructions%20A4.pdf, 13 pages (believed to have been offered for sale, publicly used, and/or published prior to the filing date of this application).

"Humane Alternative Developed for Rabbit Stunning," Livestock welfare Insight, [online] retrieved from: http://www.livestockwelfare.com/insights/insightssum06.pdf, 8 pages (believed to have been offered for sale, publicly used, and/or published prior to the filing date of this application).

\* cited by examiner

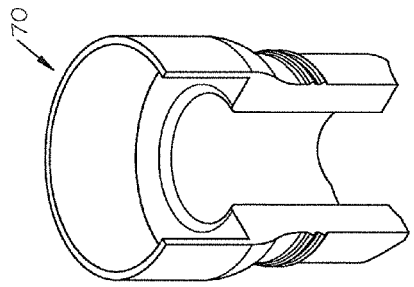
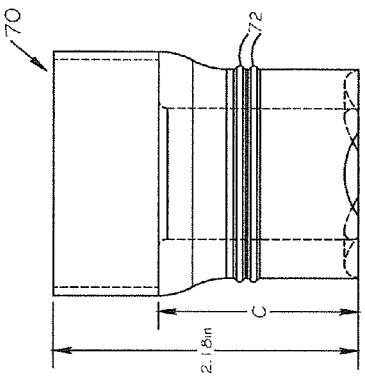
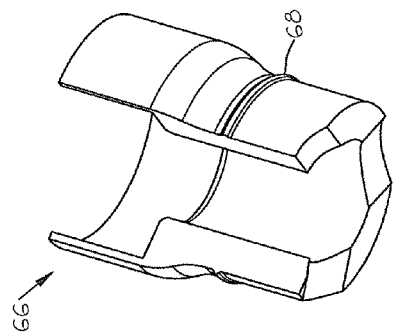
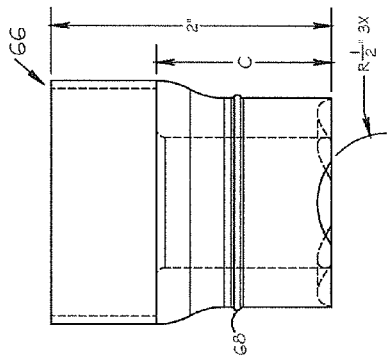
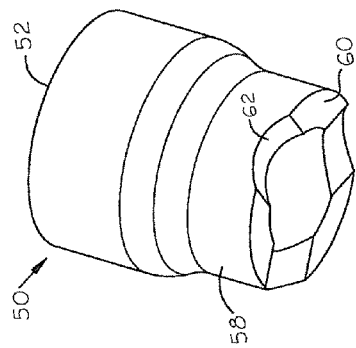
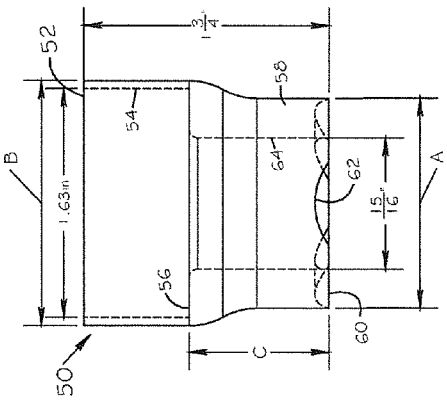

CAPTIVE BOLT TOOL SYSTEM FOR USE IN HUMANE DISPATCH OF LIVESTOCK

FIELD OF THE INVENTION

The present invention relates generally to captive bolt tool systems that are used in stunning or dispatch of livestock.

BACKGROUND OF THE INVENTION

Euthanasia of livestock is necessary both for livestock processing operations and for farms and other facilities where it is necessary to euthanize sick, injured or compromised animals. There's been significant effort dedicated to developing devices, methods and guidelines or the humane dispatch of livestock.

Captive bolt devices represent one category of tool for use in the euthanasia of livestock. These devices have a housing that supports a moveable bolt that is moved between a retracted and extended position using a variety of actuation mechanisms. The bolts are "captive" because they are not released from the housing. Instead, the bolt is returned to the retracted position after each operation.

Penetrating captive bolt devices are used for stunning animals prior to processing and generally have a long cylindrical bolt that penetrates the skull of an animal to be euthanized. Proper use typically entails locating the device such that the captive bolt penetrates through the skull attempting to disrupt the brain stem and stun the animal into unconsciousness. If the brain is sufficiently damaged during the stun the animal will be unrecoverable and considered euthanatized. Euthanasia by penetrating captive bolt may be aesthetically displeasing.

Non-penetrating captive bolt devices typically have a wide mushroom-shaped head on the captive bolt that does not penetrate the brain of the animal. Generally, such devices are used only to stun the animal into unconsciousness, after which a secondary step, such as exsanguination, is performed to ensure the animal is unrecoverable.

SUMMARY OF THE INVENTION

The present invention provides various embodiments of a captive bolt tool system for use in the humane dispatch of livestock. The first embodiment includes a tool housing with a working end and a moveable bolt having an end effector for stunning or dispatch of livestock. An actuation mechanism is disposed in the housing and operable to move the moveable bolt between a retracted position and an extended position. The first and second subject adapters are interchangeably connected to the tool housing. The subject adaptors each have an attachment end that is selectively received on the working end of the tool housing and an outer operation end with a contoured end surface. The contoured end surface is shaped so as to mate with an outer surface of a head of a particular species or type of livestock in a predefined area for humane dispatch. An operating distance is defined between the working end of the tool housing and the contoured end surface of the subject adapter when the subject adapter is received on the working end of the tool housing. In some versions, the shape of the contoured end surface of the first subject adapter is different than the shape of the contoured end surface of the second subject adapter such that the first and second subject adapters are configured for use with different livestock. Alternatively or additionally, the operating distance of the first subject adapter is different than the operating distance of the second subject adapter such that the outermost end of the end effector of the moveable bolt in the extended position protrudes by differing amounts when used with the first and second subject adapters.

In some versions, the tool housing has a main body with a guide attached thereto and the moveable bolt extends through the guide. The tool housing further has an activator moveably received on the guide with the activator defined in the working end of the tool housing. The activator may have an extended position and a retracted position with the activator being moved to the retracted position prior to movement of the moveable bolt to the extended position. The attachment end of each subject adapter may be generally cylindrical with an inner diameter sized to be received on the working end of the tool housing. The outer operation end of each subject adapter may be generally cylindrical with an outer diameter smaller than the outer diameter of the attachment end.

In some versions, each subject adapter has indicia thereon, corresponding to the operating distance of the subject adapter.

In some versions, the outer operation end of one of the subject adapters is generally cylindrical and the contoured end surface is generally flat with at least one relief cutout defined therein.

In certain versions, the outer operation end of one of the subject adapters is generally cylindrical and the contoured end surface is generally arcuate. The generally arcuate end surface has a radius and in some versions the radius of the end surface is greater than a radius of the generally cylindrical outer operation end.

In some versions, the end effector has a central element with an outer end having a first diameter and a disk portion having a second diameter greater than the first diameter. This central element extends from the disk portion and defines a first-stage operable to crack the skull of livestock without penetrating into the brain. The disk portion defines a second-stage operable to transfer the remaining kinetic energy of the moveable bolt, thereby dispatching the livestock without penetrating into the brain.

A second embodiment of a captive bolt tool system for use in humane dispatch of livestock includes a tool housing with a working end and a moveable bolt having a two-stage end effector for non-penetrating dispatch of livestock. An actuation mechanism is disposed in housing and is operable to move the moveable bolt between a retracted position and an extended position. The end effector has a central element with an outer end having a first diameter and a disk portion having a second diameter greater than the first diameter. This central element extends from the disk portion and defines a first-stage operable to crack the skull of livestock without penetrating into the brain. The disk portion defines a second-stage operable to transfer the remaining kinetic energy of the moveable bolt thereby dispatching the livestock without penetrating the skull.

Some versions further include a subject adapter connected to the working end of the tool housing. The subject adapter has an outer operation end with a contoured end surface shaped so as to mate with an outer surface of a head of a particular species of livestock in a predefined area for humane dispatch. This subject adapter may be a first subject adapter and the system may further include a second subject adapter. The first and second subject adapters are interchangeably connected to the tool housing. Each has an attachment end that is selectively received on the working end of the tool. The attachment end of each subject adapter may be generally cylindrical with an inner diameter sized to be received on the working end of the tool housing.

In some versions, the tool housing has a main body with a guide attached thereto and the moveable bolt extends through the guide. The tool housing further has an activator moveably received on the guide, with the activator defining the working end of the tool housing. The activator may have an extended position and a retracted position, with the activator being moved to the retracted position prior to movement of the moveable bolt to the extended position.

In some versions, the central element of the end effector is generally cylindrical and has a diameter of less than 0.5 inches. This central element extends from the disk portion by less than 0.5 inches. Alternatively, the central element may extend from the disk portion by less than 0.3 inches.

In some versions, the central element of the end effector is generally cylindrical and has a sidewall. The disk portion has an outwardly facing surface adjacent to the central element and this outwardly facing surface is generally perpendicular to the sidewall of the central element. The diameter of the central element of the end effector may be less than 0.5 inches and the central element may extend from the disk portion by less than 0.5 inches.

BRIEF DESCRIPTION OF THE DRAWINGS

FIG. 4A is a perspective view of a first version of a subject adapter for use with the present invention;

FIG. 4B is a side view of the subject adapter of FIG. 4A with dashed lines showing internal features;

FIG. 5A is a perspective view of a partially cutaway second version of a subject adapter for use with the present invention;

FIG. 5B is a side view of the subject adapter of FIG. 5A with dashed lines showing internal features;

FIG. 6A is a perspective view of a partially cutaway third version of a subject adapter for use with the present invention;

FIG. 6B is a side view of the subject adapter of FIG. 6A with dashed lines showing internal features;

FIG. 15 is a side view of the components with yet a further version of a subject adapter connected thereto, again with the alternative end effector on the moveable bolt;

DETAILED DESCRIPTION OF THE PREFERRED EMBODIMENTS

The present invention provides a number of improvements to captive bolt tool systems for use in the human dispatch of livestock. Some of these improvements are applicable to both penetrating and non-penetrating captive bolt tool systems and other improvements are specifically aimed at non-penetrating captive bolt systems. One aspect of the present invention is directed to a captive bolt tool system with subject adapters that are interchangeably connected to a tool housing. These interchangeable subject adapters allow the use of the tool system with multiple types and ages of livestock. For example the subject adapters may have a variety of shapes on the end surface so as to mate with the outer surface of the heads of particular species or types of livestock in a predefined area for humane dispatch. The subject adapters may also vary in their operating distances, which varies the position of the end effector on the moveable bolt relative to the head of the livestock when the bolt is in its fully extended position. This allows the amount of energy transferred to the livestock to be varied.

Another aspect of the present invention is directed to an end effector shape. The moveable bolt of the captive bolt system has an end effector that contacts the head of the livestock. Some embodiments of the present invention provide an end effector for non-penetrating dispatch of livestock. Typically, non-penetrating captive bolt tool systems are effective only for stunning of animals. However, the present invention provides an end effector that is non-penetrating but also effective for dispatch. The end effector is a two-stage end effector with a central element extending from a disk portion. The central element defines a first-stage operable to crack the skull of the livestock without penetrating the brain and the disk portion defines a second-stage operable to transfer the remaining kinetic energy of the moveable bolt, thereby dispatching the livestock without penetrating the brain.

Embodiments of the present invention will be discussed that include more than one aspect of the present invention. However, as will be clear to those of skill in the art, the various aspects of the present invention may be used independently of one another. Some of the drawings provided herewith are scale drawings and may include exemplary dimensions thereon. While these drawings accurately represent certain embodiments of the present invention, the present invention is not limited to the illustrated dimensions, shapes or sizes.

Figure 1:
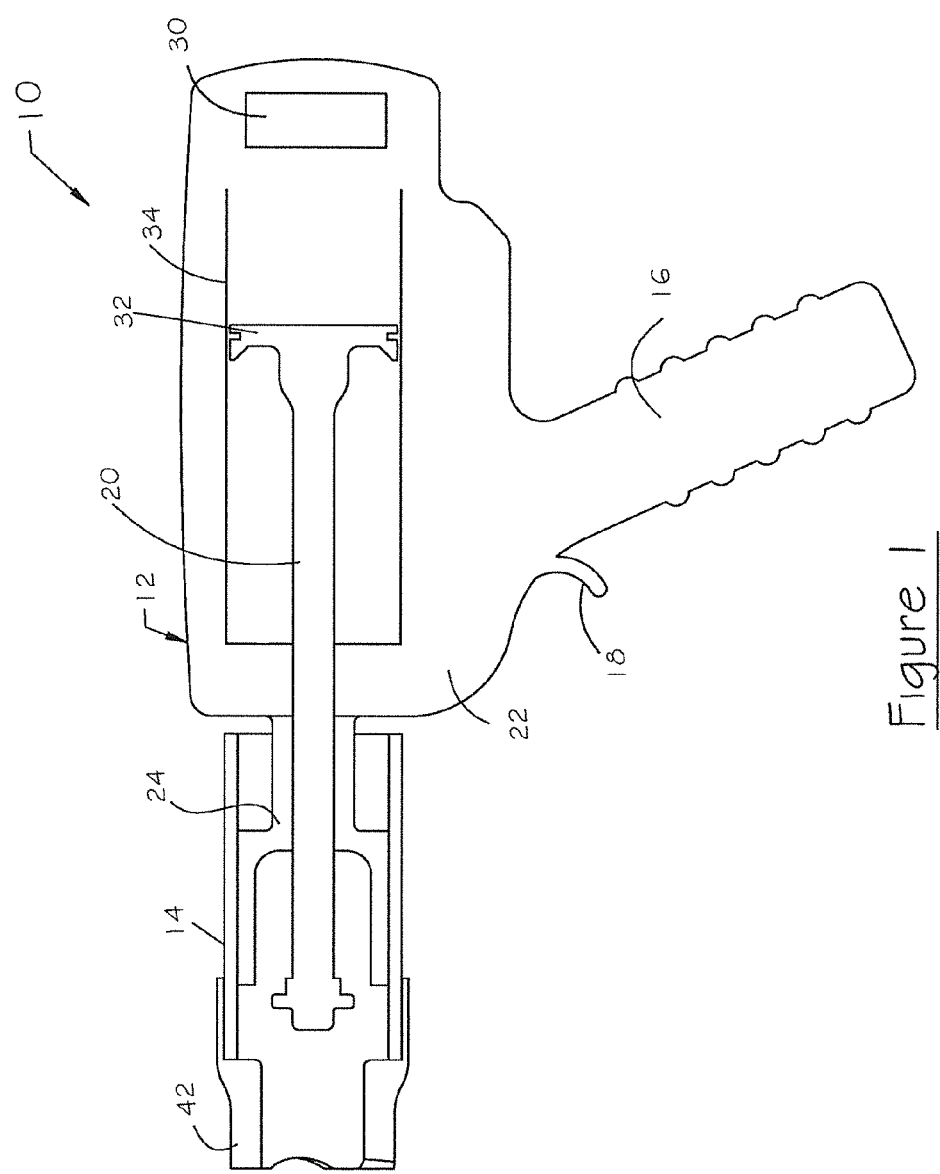
FIG. 1 is a side view, partially in cross-section, of an embodiment of a captive tool system in accordance with the present invention.
Figure 3:
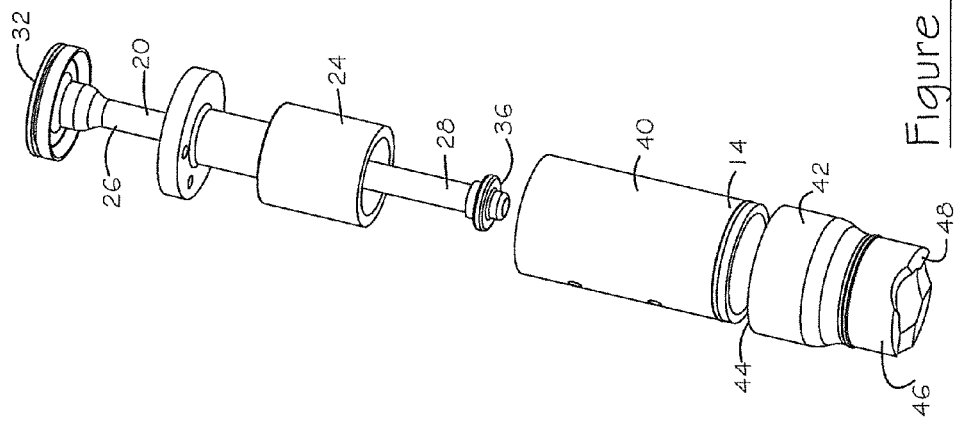
FIG. 3 is an exploded view of the components of FIG. 2.
Figure 2:
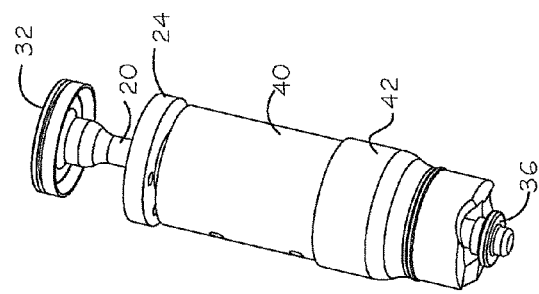
FIG. 2 is a perspective view of certain components of the tool in FIG. 1.

FIG. 1 illustrates an exemplary embodiment of a captive bolt tool system in accordance with the present invention. The tool system 10 includes a tool housing 12 with a working end 14. In the illustrated embodiment, the tool housing 12 has a shape similar to some power tools and includes a handle 16 to be gripped during use and a trigger 18 for operating the tool system 10. The tool system includes a moveable bolt 20 that is supported by the tool housing 12. The housing 12 may be may be said to have a main body 22 with a guide 24 attached to forward end thereof. As shown, the bolt 20 extends through the guide. FIGS. 2 and 3 provide assembled and exploded views, respectively, of some of the components of the tool system. Referring to FIGS. 1-3, the bolt 20 is an elongated generally cylindrical element having an inner end 26 and outer end 28. The inner end 26 is in communication with an actuation mechanism 30 which is operable to move the moveable bolt between the illustrated retracted position and an extended position in which the bolt contacts the head of the livestock. In the illustrated embodiment, the actuation mechanism takes a form of a piston 32 attached to the inner end 26 of the bolt and a cylinder 34. An explosive charge is placed into cylinder 34 and ignited so as to rapidly move the piston 32 and bolt 20 from the retracted position to the extended position. The present invention is not limited to this actuation mechanism.

The outer end 28 of the bolt 20 includes an end effector 36. As shown, the bolt 20 extends through the guide 24 such that the outer end 28 and end effector 36 are on one side of the guide 24 and the inner end 26 and piston 32 are on the other side of the guide 24. The guide supports and guides the moveable bolt between its retracted and extended positions. In the illustrated embodiment, the activator 40 is interconnected with the guide 24 and defines the working end 14 of the tool housing. The activator is a safety mechanism that prevents actuation of the tool system 10 unless the activator 40 is moved rearwardly to an actuation or retracted position. Once the activator 40 is moved rearwardly to the retracted position, the tool system is operable to be triggered and to move the movable bolt to the extended position.

According to some embodiments of the present invention, a subject adapter 42 is interchangeably connected to the tool housing 12. In the illustrated embodiment, the subject adapter 42 is received on the working end 14 of the activator 40. Both the subject adapter 42 and the activator 40 are generally cylindrical and, in the illustrated embodiment, the subject adapter receives the working end 14 of the activator into its inner end. The subject adapter 42 may be said to have an attachment end 44 that is selectively received on the working end of the tool housing and an outer operation end 46. In some embodiments, the outer operation end 46 has a contoured end surface 48 that is shaped so as to mate with the outer surface of a head of a particular species or type of livestock in a predefined area for humane dispatch. According to some embodiments of the present invention, a plurality of interchangeable subject adapters are provided, providing for use with a variety of livestock species or types and/or for altering the energy transfer characteristics of the tool system. Some of the plurality of interchangeable subject adapters may have different shapes to the contoured end surface. Others of the plurality of subject adapters may have differing operating distances so as to change the position of the end effector relative to the head of livestock when the moveable bolt is in its fully extended position. Some versions of subject adapters will now be discussed in more detail.

FIGS. 4A and 4B illustrate a first version of a subject adapter 50 for use with the present invention. The subject adapter 50 has an attachment end 52 that is generally cylindrical and has a generally cylindrical inner diameter 54 for receiving the outer end of the activator. As shown, this inner diameter 54 extends into the subject adapter to a shoulder 56. In use, the subject adapter is attached to and moves with the activator. The working end of the activator contacts the shoulder 56. The opposite end of the subject adapter is an operation end 58. In the illustrated embodiment, this operation end 58 is also cylindrical and has an outer diameter A that is smaller than the outer diameter B of the attachment end 52. The outer operation end 58 has a contoured end surface 60 that is shaped so as to mate with the outer surface of a head of a particular species or type of livestock. In this version, the contoured outer surface is generally flat with multiple cutouts 62 defined therein. This contoured end surface 60 is designed for contact with the head of a turkey and the cutouts 62 allow space for some of the loose skin on the head of the turkey to be displaced into the cutouts when the end surface 60 is pressed against the head of the turkey in an area suitable for humane dispatch of the turkey. The operation end 58 of the adapter 50 has an inner diameter 64 that allows passage of the end effector of the moveable bolt. The subject adapter 50 may be said to have an operating distance C defined between the working end of the tool housing, which contacts the shoulder 56, and the contoured end surface 60. As will be clear to those of skill in the art, by altering the operating distance C, the position of the end effector relative to the end surface 60 may be varied.

Referring now to FIGS. 5A and 5B, a second version of a subject adapter is shown at 66. This subject adapter is identical to the subject adapter 50 except that the operating distance C is greater. The operating distance C of the subject adapter 50 is approximately 1 inch, while the operating distance C of the subject adapter 66 is approximately 1.25 inches. The subject adapter 66 also has a raised line or ridge 68 around the outer surface of the operation end, while the subject adapter 50 has no such line or ridge. The ridge 68 serves as indicia to allow a user to determine the relative operating distance of a particular subject adapter. The single ridge on the subject adapter 66 indicates that it is longer than the subject adapter 50, which lacks a ridge.

FIGS. 6A and 6B illustrate a third version of a subject adapter 70 having an operating distance of approximately 1.5 inches. This subject adapter has two ridges 72 on its outer surface serving as a indicia of its greater length.

Figure 9A:
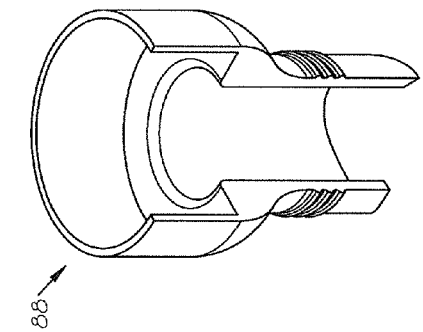
FIG. 9A is a perspective view of a partially cutaway sixth version of a subject adapter for use with the present invention.
Figure 9B:
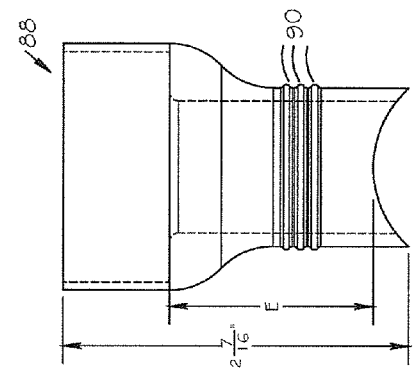
FIG. 9B is a side view of the subject adapter of FIG. 9A with dashed lines showing internal features.
Figure 8A:
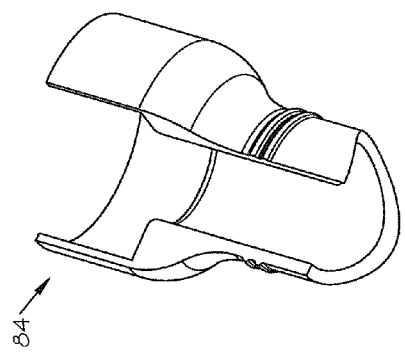
FIG. 8A is a perspective view of a partially cutaway fifth version of a subject adapter for use with the present invention.
Figure 8B:
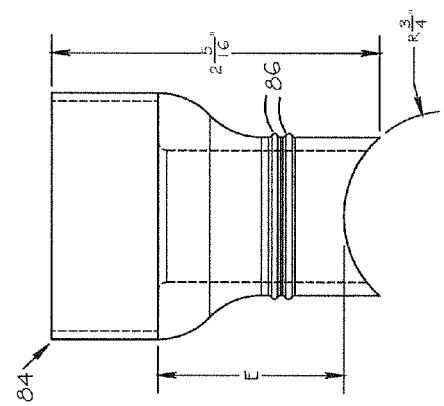
FIG. 8B is a side view of the subject adapter of FIG. 8A with dashed lines showing internal features.
Figure 7A:
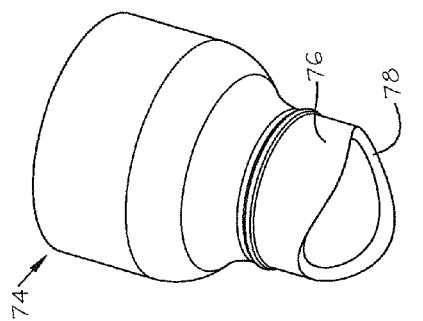
FIG. 7A is a perspective view of a fourth version of a subject adapter for use with the present invention.
Figure 7B:
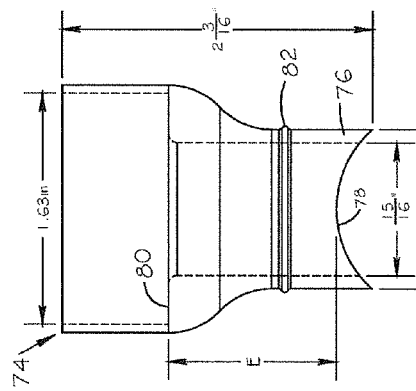
FIG. 7B is a side view of the subject adapter of FIG. 7A with dashed lines showing internal features.

Referring now to FIGS. 7A and 7B, a fourth version of a subject adapter for use with the present invention is shown at 74. This subject adapter 74 differs from the first, second and third subject adapters in that it has a differently sized operation end 76 with a differently shaped contoured end surface 78. In this version, the contoured end surface is a generally arcuate end surface, which is radiused, as shown. In the illustrated embodiment, the radius of this arcuate end surface is approximately 0.75 inches. The operation end 76 of the subject adapter 74 has an outer diameter F of approximately 1.125 inches corresponding to a radius of 0.5625 inches. As such, the radius of the contoured end surface 78 is greater than the radius of the operation end 76. This configuration of subject adapter may be suited for use with chicken and geese. The subject adapter 74 may be said to have an operating distance E defined between the working end of the tool housing, which rests against shoulder 80, and the closest portion of the contoured end surface 78. Alternatively, an operating distance could be defined differently, such as the distance from the shoulder 80 to the furthest portion of the contoured end surface. In the illustrated embodiment, the operating distance E is approximately 1.2 inches. This subject adapter has as single ridge 82 defined thereon. FIGS. 8A and 8B illustrate a fifth version of a subject adapter 84 with a larger operating distance E of approximately 1.3 inches and two ridges 86 indicating this greater length. FIGS. 9A and 9B illustrate a sixth version of a subject adapter 88 with an operating distance of approximately 1.5 inches and three ridges 90.

The subject adapters shown in FIGS. 4-9 are exemplary of some versions, but additional versions may be provided. For example, other operating distances may be provided or subject adapters with different shapes or different contoured end surfaces may be provided.

Figure 10:
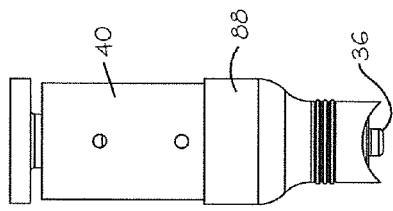
FIG. 10 is a side view of components of a tool system with the second version of the subject adapter connected thereto.
Figure 11:
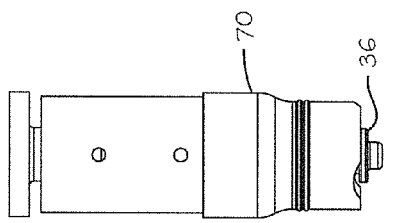
FIG. 11 is a side view of the components with the third version of the subject adapter connected thereto.
Figure 12:
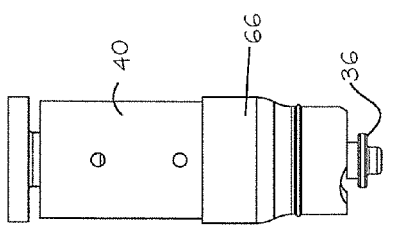
FIG. 12 is a side view of the components with the sixth version of the subject adapter connected thereto.

FIG. 10 provides a view of the activator 40 and other components of the tool system with the second version of the subject adapter 66 attached thereto. The end effector 36 is shown in its fully extended position protruding from the operation end of the subject adapter 66. This combination may be suitable for use with male turkeys. FIG. 11 is similar to FIG. 10 but shows the third version of the subject adapter 70, which has a larger operating distance than the subject adapter 66. As such, the end effector 36 protrudes by a lesser distance. This combination may be suitable for female turkeys. FIG. 12 illustrates the sixth version of the subject adapter 88 connected to the activator 40. Again, the end effector 36 is shown relative to the contoured end surface of the subject adapter. This combination may be suitable for use with ducks, geese, and younger turkeys.

Figure 13:
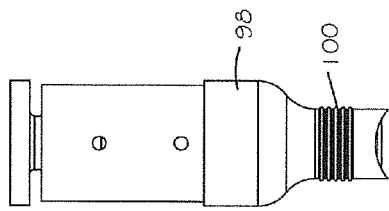
FIG. 13 is a side view of the components with the sixth version of the subject adapter attached thereto and with an alternative end effector on the moveable bolt.
Figure 14:
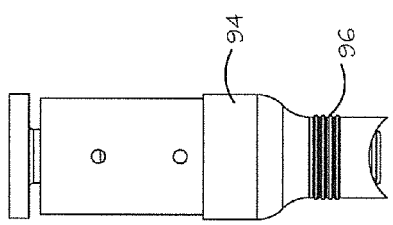
FIG. 14 is a side view of the components with a further version of a subject adapter attached thereto and with the alternative end effector on the moveable bolt.

FIG. 13 again shows the sixth version of the subject adapter 88 but this time with an alternative end effector 92 on the bolt. The end effector 92 is a flat larger diameter end effector and operates to stun livestock. This combination may be suitable for large male chickens. FIG. 14 is similar to FIG. 13 but with a further alternative subject adapter 94. This subject adapter has four ridges 96 thereon indicating that it has a larger operating distance than the subject adapter 88. FIG. 15 shows yet another subject adapter 98 with five ridges and a correspondingly larger operating distance. As such, the end effector 92 protrudes by a lesser distance.

Figure 16:
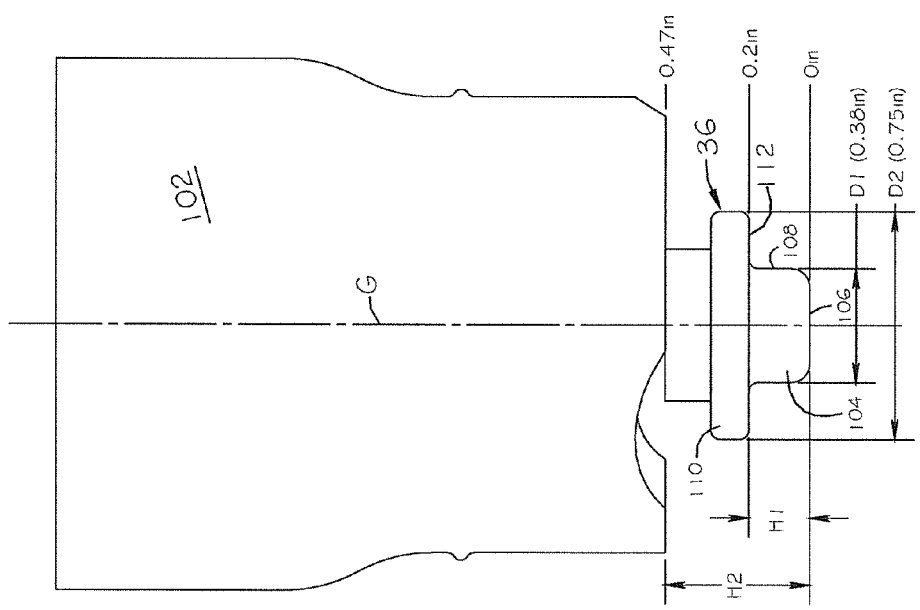
FIG. 16 is a side view of a subject adapter and end effector in accordance with present invention showing the relative positioning and including exemplary dimensions for one version.

Referring now to FIG. 16, a subject adapter 102 is shown along with the end effector 36. The end effector 36 is designed for non-penetrating dispatch of livestock. The end effector has a central element 104 with an outer end 106. In the illustrated embodiment, this central element is generally cylindrical with a sidewall 108 that is perpendicular to the generally flat end surface 106. In this version, the transition between the end surface 106 and the sidewall 108 is radiused. The central element may be said to have a first diameter D1. The end effector 36 also has a disk portion 110 with a second diameter D2 that is greater than the first diameter D1. The central element 104 extends from the disk portion 110 and defines a first-stage operable to crack the skull of livestock without penetrating the brain. The disk portion may be said to define a second-stage that is operative to transfer the remaining kinetic energy of the movable bolt and to thereby dispatch the livestock without penetrating the skull. In the illustrated embodiment, the disc portion has an outwardly facing surface 112 that is generally flat and is generally perpendicular to the sidewall 108 of the central element and to the axis G of the moveable bolt. Again, the transition between the outwardly facing surface 112 and the sidewall 108 is radiused. The relative sizes and positions of the central element 104 and the disk portion 110 are chosen so as to provide a two-stage non-penetrating dispatch of livestock.

In the illustrated embodiment the central element 104 extends from the disk portion 110 by a distance H1 of approximately 0.2 inches. In some versions, this distance H1 is in the range of 0.1 to 0.3 inches and in other versions it is less than 0.5 inches. In the illustrated embodiment, the diameter D1 of the central element is approximately 0.38 inches while the diameter of the disk portion D2 is approximately 0.75 inches. In some versions, the central element has a diameter in the range of 0.25 to 0.5 inches.

Figure 17:
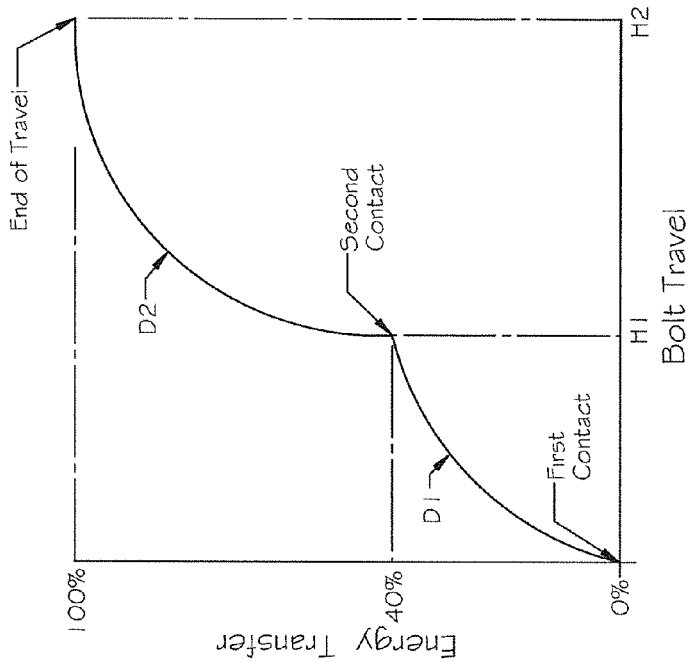
FIG. 17 is a graph showing energy transfer versus bolt travel for an embodiment of the present invention.

FIG. 17 provides a graphical representation of the energy transfer from the moveable bolt to the skull of the livestock. As shown, the first portion of kinetic energy is transferred from the point at which the bolt contacts the skull until it reaches the distance indicated at H1. This corresponds to the first-stage of the end effector, defined by the central element. In the illustrated version, this transfers approximately 40 percent of the kinetic energy of the bolt. At this point, the disk portion makes a second contact with the skull and the remaining 60 percent of the kinetic energy is transferred to the skull as the bolt travels to the position indicated at H2. H2 corresponds to the distance indicated in FIG. 16 between the end surface of the subject adapter 102 and the outermost end of the central element 104. In traditional penetrating captive bolt tool systems, a portion of the kinetic energy of the bolt is utilized to penetrate the skull and the brain tissue, but a significant portion of the kinetic energy is absorbed by the tool itself when the bolt reaches the limit of its travel. In the present invention, most or all of the kinetic energy is transferred to the skull. The smaller diameter of the first-stage impact cracks the skull, weakening the skull, and thereby defining a specific energy path for acting on by the larger diameter of the second stage impact. Efficient energy transfer of the two described impacts aesthetically renders the animal instantly insensible and causes irrecoverable internal trauma, thereby eliminating the need for traditional secondary methods to complete the dispatch.

It will be clear to those of skill in the art, the herein described embodiments of the present invention may be altered in various ways without departing from the scope or teaching to the present invention. It is the following claims, including all equivalents, which define the scope of the present invention.

The invention claimed is:

1. A captive bolt tool system for use in humane dispatch of livestock, the tool system comprising
    a tool housing with a working end;
    a movable bolt having an end effector for stunning or dispatching livestock;
    an actuation mechanism disposed in the housing and operable to move the movable bolt between a retracted position and an extended position; and
    a first and a second subject adaptor interchangeably connected to the tool housing, the subject adaptors each having an attachment end that is selectively received on the working end of the tool housing and an outer operation end with a contoured end surface, the contoured end surface shaped so as to mate with an outer surface of a head of a particular species or type of livestock in a predefined area for humane dispatch;
    an operating distance being defined between the working end of the tool housing and the contoured end surface of the subject adaptor when the subject adaptor is received on the working end of the tool housing;
    wherein:
    the shape of the contoured end surface of the first subject adaptor is different than the shape of the contoured end surface of the second subject adaptor such that the first and second subject adaptors are configured for use with different livestock; or
    the operating distance of the first subject adaptor is different than the operating distance of the second subject adaptor such that an outermost end of the end effector of the movable bolt in the extended position protrudes by differing amounts when used with the first and second subject adaptors.

2. A captive bolt tool system in accordance with claim 1, wherein:
    the tool housing has a main body with a guide attached thereto, the movable bolt extending through the guide;
    the tool housing further having an activator movably received on the guide, the activator defining the working end of the tool housing.

3. A captive bolt tool system in accordance with claim 2, wherein:

the activator has an extended position and a retracted position, the activator being moved to the retracted position prior to movement of the movable bolt to the extended position.

4. A captive bolt tool system in accordance with claim 2, wherein:
the attachment end of each subject adaptors is generally cylindrical with an inner diameter sized to be received on the working end of the tool housing.

5. A captive bolt tool system in accordance with claim 4, wherein:
the outer operation end of each subject adaptors is generally cylindrical with an outer diameter smaller than an outer diameter of the attachment end.

6. A captive bolt tool system in accordance with claim 1, wherein:
each subject adaptor has indicia thereon, the indicia corresponding to the operating distance of the subject adaptor.

7. A captive bolt tool system in accordance with claim 1, wherein:
the outer operation end of one of the subject adaptors is generally cylindrical and the contoured end surface is generally flat with at least one cutout defined therein.

8. A captive bolt tool system in accordance with claim 1, wherein:
the outer operation end of one of the subject adaptors is generally cylindrical and the contoured end surface is generally arcuate.

9. A captive bolt tool system in accordance with claim 8, wherein:
the generally arcuate end surface has a radius; and
the generally cylindrical outer operation end has a radius that is less than the radius of the generally arcuate end surface.

10. A captive bolt tool system in accordance with claim 1, wherein:
the end effector has a central element with an outer end having a first diameter and a disk portion having a second diameter greater than the first diameter, the central element extending from the disk portion, the central element defining a first stage operable to crack the skull of livestock without penetrating into the brain and the disk portion defining a second stage operable to transfer a remaining kinetic energy of the movable bolt thereby dispatching the livestock without penetrating into the brain.

11. A captive bolt tool system for use in humane dispatch of livestock, the tool system comprising
a tool housing with a working end;
a movable bolt having a two stage end effector attached thereto for non-penetrating dispatch of livestock, and;
an actuation mechanism disposed in the housing and operable to move the movable bolt between a retracted position and an extended position; and
the end effector having a central element with an outer end having a first diameter and a disk portion having a second diameter greater than the first diameter, the central element extending from the disk portion, the central element defining a first stage adapted to crack the skull of livestock without penetrating into the brain and the disk portion defining a second stage adapted to transfer a remaining kinetic energy of the movable bolt thereby dispatching the livestock without penetrating the skull.

12. A captive bolt tool system in accordance with claim 11, further comprising:
a subject adaptor connected to the working end of the tool housing, the subject adaptor having an outer operation end with a contoured end surface, the contoured surface shaped so as to mate with an outer surface of a head of a particular species of livestock in a predefined area for humane dispatch.

13. A captive bolt tool system in accordance with claim 12, wherein:
the subject adaptor is a first subject adaptor;
the tool system further comprising a second subject adaptor;
the first and second subject adaptors interchangeably connected to the tool housing, the subject adaptors each having an attachment end that is selectively received on the working end of the tool.

14. A captive bolt tool system in accordance with claim 13, wherein:
the attachment end of each subject adaptors is generally cylindrical with an inner diameter sized to be received on the working end of the tool housing.

15. A captive bolt tool system in accordance with claim 11, wherein
the tool housing has a main body with a guide attached thereto, the movable bolt extending through the guide;
the tool housing further having an activator movably received on the guide, the activator defining the working end of the tool housing.

16. A captive bolt tool system in accordance with claim 15, wherein:
the activator has an extended position and a retracted position, the activator being moved to the retracted position prior to movement of the movable bolt to the extended position.

17. A captive bolt tool system in accordance with claim 11, wherein:
the central element of the end effector is generally cylindrical;
the diameter of the central element of the end effector is in the range of 0.25 to 0.5 inches; and
the central element extends from the disk portion by a distance in the range of 0.1 to 0.5 inches.

18. A captive bolt tool system in accordance with claim 17, wherein:
the central element extends from the disk portion by less than 0.3 inches.

19. A captive bolt tool system in accordance with claim 11, wherein:
the central element of the end effector is generally cylindrical and has a side wall;
the disk portion has an outwardly facing surface adjacent the central element, the outwardly facing surface being generally perpendicular to the side wall of the central element.

20. A captive bolt tool system in accordance with claim 19, wherein:
the diameter of the central element of the end effector is less than 0.5 inches; and
the central element extends from the disk portion by less than 0.5 inches.

* * * * *